United States Patent Office 3,781,416
Patented Dec. 25, 1973

3,781,416
CARBON DISULFIDE DISINFECTANT FOR
COCCIDIA OOCYSTS AND WORM EGGS
Karl-Georg Ellinger, Hamburg, and Henning Schumacher, Friedrichsgabe, Germany, assignors to Sterwin A.G., Zug, Switzerland
No Drawing. Filed Aug. 21, 1970, Ser. No. 66,054
Int. Cl. A01n 11/06; A61k 27/00
U.S. Cl. 424—44
15 Claims

ABSTRACT OF THE DISCLOSURE

A method is provided for killing coccidia oocysts and worm eggs by contacting them with carbon disulfide which is released by adding an acid to a dithiocarbamate salt.

Coccidiosis is a wide spread and dangerous disease caused by intestinal parasites which affects particularly poultry and other birds as well as rabbits, pigs, sheep and other domesticated animals. The confined conditions under which domestic animals are maintained, for example, such as fowl in turkey and chicken farms, are conducive to coccidiosis infection and the rapid spread thereof. Coccidiosis is caused and distributed by protozoa known as coccidia, which gain access to the host by the host's ingestion of food, drinking water, or soil contaminated with oocysts which occur in the fecal droppings of animals and fowl harboring coccidia. It is therefore desirable to find an effective disinfectant which can be used prophylactically for killing the external living oocysts before they can be ingested.

Common disinfectants, containing as active ingredients, phenols or formaldehyde are able to penetrate through the highly resistant lipid and wax-like protecting layers (lipid containing shells) of the coccidia oocysts and worm eggs, such as, for example, Ascaridae worm eggs, only after a period of 12 hours or more, as a result of which the killing rates of such disinfectants are not satisfactory and 100% kill is infrequently achieved.

It is known that carbon disulfide, because of its excellent dissolving properties for lipids and excellent biocidal properties, is a very effective agent for effecting, in but a few seconds, complete destruction of the coccidia oocysts. On the other hand, the low boiling point of 46° C. and the high vapor pressure, as well as the high inflammability and the danger of formation of explosive mixtures with air, present great problems for the packaging, storage and shipping of carbon disulfide as a disinfectant, either in pure form or in the form of an aqueous emulsion.

It has now been found that it is possible to produce a storable mixture which contains no free carbon disulfide but which contains a compound which, in aqueous emulsion, releases carbon disulfide on treatment with a proton donor. This mixture is stable during long storage and is completely safe, that is, it does not decompose into poisonous or inflammable materials, and the disinfectant, in the form of a carbon disulfide-containing aqueous emulsion, can quickly and conveniently be prepared therefrom just prior to use.

The object of this invention therefore is to provide a composite package comprising a storable mixture, for the preparation of an aqueous disinfectant, useful for killing coccidia oocysts and worm eggs, wherein the storable mixture consists of two components (a) and (b), isolated one from the other, wherein the component (a) comprises a dry mixture containing a compound capable of releasing carbon disulfide in aqueous solution in the presence of a proton donor, a nonionic or anionic emulsifier, an alkali stabilizer and an inorganic builder salt; and component (b) comprises a compound, which, in aqueous solution, is a proton donor, i.e., an acid, an acid derivative or an acidic salt.

The disinfectant is prepared just prior to use by adding at least an amount of component (b) to a solution or emulsion of component (a) in water which is sufficient to neutralize the alkali stabilizer and to hydrolyze the carbon disulfide splitting compound thus releasing free carbon disulfide.

Several classes of compounds are known to release carbon disulfide under acidic conditions and therefore, in principle, can be used as ingredients in component (a) of the mixture of the invention, for example, dithiocarbamates, xanthates, trithiocarbonates, perthiocarbonates, and perthiocarbonic acid esters. However, those classes of compounds which release, in addition to carbon disulfide, hydrogen sulfide, mercaptans, dithiols or similar extremely foul smelling and toxic compounds are not suitable. Of the above mentioned classes of compounds, trithiocarbonates, perthiocarbonic acid esters and perthiocarbonates are for that reason not suitable. Xanthates hydrolyze slowly and incompletely because of the relatively stable carbon-oxygen bonding, which reduces their utility. Especially suitable and preferred compounds, which release carbon disulfide under acidic conditions, are dithiocarbamates having the formula

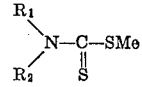

wherein $R_1$ and $R_2$ each represent a member of the group consisting of alkyl or aralkyl, or $R_1$ and $R_2$ taken together represent alkylene having from four to six carbon atoms inclusive wherein a carbon atom of said alkylene at least one carbon atom removed from the nitrogen atom can be replaced by —O— or —S—, and Me represent a cation derived from a member of the group consisting of alkali metal, alkaline earth metal and secondary amine.

In addition to the alkali metal and alkaline earth metal salts, amine and hydrazine salts are also quite stable. Preferred secondary amines are morpholine, and di-(lower-alkyl)amines such as, for example, dimethylamine, methylethylamine, diethylamine, diisopropylamine, dihexylamine, and the like.

It will be understood that the term alkyl used in defining the members represented by $R_1$ and $R_2$ above means such groups preferably containing from one to twelve carbon atoms which can be arranged as straight or branched chains, and, without limiting the generality of the foregoing, are illustrated by methyl, ethyl, propyl, isopropyl, butyl, sec-butyl, amyl, hexyl, dodecyl and the like. Thus, examples of dithiocarbamic acids from which the corresponding dithiocarbamate salts are derived are illustrated by, but not limited to, dimethyldithiocarbamic acid, diethyldithiocarbamic acid, ethylmethyldithiocarbamic acid, diisopentyldithiocarbamic acid, didodecyldithiocarbamic acid, dibenzyldithiocarbamic acid, diphenethyldithiocarbamic acid and the like.

It will be further understood that when $R_1$ and $R_2$ together represent alkylene as defined hereinabove, such groups together with the nitrogen atom form heterocyclic rings which are illustrated by, but not limited to, 1-pyrrolidyl, 1-piperidyl, 1-hexahydro-1H-azepinyl and the like in the case of alkylene, 4-morpholinyl and the like in the case of alkylene wherein a carbon atom is replaced by —O—, and 4-thiomorpholinyl and the like in the case of alkylene wherein a carbon atom is replaced by —S—.

The dithiocarbamates used in the storable mixture of the invention belong to a well-known class of compounds. They can be readily prepared by known procedures, for example, by reaction of an appropriate secondary amine with carbon disulfide in the presence of either a metal hydroxide or a molar excess of the appropriate amine as a strong base (M. Bögemann, Houben-Weyl, vol. IX, 826).

For the stabilization of those dithiocarbamates which are sensitive to acidic hydrolysis, an alkali stabilizer can be added to the component (a) of the mixture of the invention in order to prevent slow hydrolysis by exposure to atmospheric carbon dioxide. Suitable compounds are alkali salts especially alkali metal- or alkaline earth metal-carbonates, borates, or phosphates. Alternatively one can also use salts of weak organic acids such as alkali metal acetates or phenoxides. Phenoxides, such as sodium trichloro-, sodium-o-phenyl- or sodium pentachlorophenoxides and others, which are converted to free phenols in the acidic or neutral range, are highly useful as they also have bactericidal effectiveness and therefore augment the activity of the carbon disulfide. Since the lipid containing shells of the oocysts and worm eggs are dissolved by carbon disulfide the phenols or other bactericidal compounds which can be incorporated in component (a) and/or (b) of the mixture of the invention can also immediately begin to exert fully their bactericidal activity.

In order to emulsify the slightly water soluble carbon disulfide ($CS_2$) set free by acidic hydrolysis of the dithiocarbamate, a nonionic and/or anionic emulsifier has to be added to component (a). Such emulsifiers belong to well known classes of compounds which are illustrated by, but not limited to, alkali metal or amine salts of alkyl- or aryl-sulfonates or -sulfates wherein the alkyl group preferably has from 8 to 22 carbon atoms, ethylene oxide (2 to 50 moles) condensation products of higher alkylphenols or aliphatic long chain (fatty) alcohols, wherein the alkyl and aliphatic group preferably have from 8 to 22 carbon atoms, and the like. The classes of amines, commonly used in the art for the preparation of the above disclosed classes of emulsifiers, are illustrated by, but not limited to, cyclic amines, such as morpholine and N-lower-alkylmorpholines, primary-, secondary- and tertiary-alkylamines, primary-, secondary- and tertiary-alkanolamines such as mono-, di- and tri-ethanolamine and mono- and tri-isopropanolamine, and N,N-di(lower-alkyl)-alkanolamines, such as N,N-dimethylethanolamine. By utilizing such emulsifiers there is obtained a clear transparent emulsion on mixing and dissolving the two components (a) and (b), in which the carbon disulfide is fully emulsified.

Finally, there can be incorporated in component (a) well known inorganic builder salts such as anhydrous alkali metal sulfates, -silicates and the like. Such salts facilitate the preparation of a homogenous powder or granulate by binding the water which is added in the course of the preparation of component (a) as described below.

The preparation of component (a) of the mixture of the invention is carried out as follows: the dithiocarbamate is thoroughly mixed with the stabilizer and builder salt and an aqueous solution of the emulsifier is then sprayed onto this mixture. Because of the ability of the builder salts to bind water, there is obtained a dry flowing granulate. Alternatively, one can add and mix a powder-like emulsifier to the above mentioned ingredients.

In order to release carbon disulfide, component (a) is dissolved or emulsified in water and an acidic component (b) is added. As disclosed hereinabove at least an amount of acid should be added sufficient to neutralize the alkaline reacting stabilizer and to ensure that the dithiocarbamate is fully hydrolyzed. All water-soluble, free acids or derivatives of acids which are readily converted in aqueous solution to free acids are suitable, for example, acid derivatives such as anhydrides, acid halides and acid esters which are easily hydrolyzed to the corresponding free acid, as well as acidic salts. Especially useful acidic salts are the hydrogen sulfates and hydrogen phosphates, such as alkali metal hydrogen sulfates and hydrogen phosphates.

The invention is illustrated by the following examples without, however, being limited thereto.

In the following examples, two compositions, designated as component (a) and component (b) were prepared and compositely packaged in a manner whereby they were kept isolated, one from the other, until the disinfectant solution was prepared for use.

EXAMPLE 1

Component (a):     Wt. percent
  Sodium dimethyldithiocarbamate dihydrate ____ 47
  Sodium higher alkane sulfonate emulsifier (Warulat U) ____ 10
  Sodium sulfate ____ 6
  Sodium carbonate ____ 1
Component (b):
  Potassium hydrogen sulfate ____ 36

The component (a) was found to be stable for a long period of time. Just before the use of the disinfectant, components (a) and (b) of Example 1 were dissolved in 90 or 95 parts of water. The hydrolysis of the dithiocarbamate was complete within a few minutes and the 5 to 10% carbon disulfide solution so obtained was ready for immediate use. This solution killed coccidia oocysts in both encysted and excysted stages immediately and completely.

EXAMPLE 2

Component (a):     Wt. percent
  Sodium 1-morpholinecarbodithioate dihydrate __ 49
  Condensation product of nonylphenol with 9 mol ethylene oxide ____ 2
  Higher alkanesulfonate emulsifier ____ 8
  Sodium sulfate ____ 2
  Sodium trichlorophenoxide ____ 3
Component (b):
  Potassium hydrogen sulfate ____ 36

The mixture of Example 2 was stored and found to remain stable for a long period of time. The solution of the disinfectant was prepared, by the method described hereinabove, that is, by dissolving component (a) in 90 to 95 parts water and mixing in component (b), whereby the carbon disulfide was released and emulsified. This solution killed coccidia oocysts in both encysted and excysted stages immediately and completely.

We claim:

1. A method of killing coccidia oocysts and worm eggs shed in the fecal droppings of poultry and domesticated animals comprising contacting the coccidia oocysts and worm eggs with an aqueous emulsion containing an effective amount of carbon disulfide, said carbon disulfide being released by the addition of an acid to an aqueous emulsion which has been prepared just prior to use by admixture in water of: a dry mixture consisting of a dithiocarbamate salt, capable of releasing carbon disulfide in aqueous solution under acidic conditions, having the formula

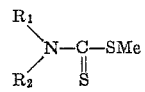

wherein $R_1$ and $R_2$ each represent a member of the group consisting of alkyl and phenylalkyl each having from one to twelve carbon atoms in the alkyl chain, or $R_1$ and $R_2$ taken together represent alkylene having from four to six carbon atoms inclusive wherein a carbon atom of said alkylene at least one carbon atom removed from the nitrogen atom can be replaced by —O— or —S—, and Me represents a cation derived from a member of the group consisting of alkali metal, alkali earth metal and secondary amine; a nonionic or anionic emulsifier; an alkali stabilizer; and a water binding inorganic builder salt selected from alkali metal sulfate and alkali metal silicate.

2. The method according to claim 1 wherein the alkali stabilizer is an alkali salt.

3. The method according to claim 2 wherein the alkali salt is an alkali metal or alkaline earth metal carbonate, borate, phosphate, acetate or phenoxide.

4. The method according to claim 3 wherein the acid is an alkali metal hydrogen sulfate or an alkali metal hydrogen phosphate.

5. The method according to claim 4 wherein the alkali salt is sodium carbonate.

6. The method according to claim 5 wherein the emulsifier is an alkali metal salt or amine salt of alkyl sulfonate or alkyl sulfate, an ethylene oxide condensation product of alkylphenol, an ethylene oxide condensation product of fatty alcohol, or a combination thereof.

7. The method according to claim 6 wherein the emulsifier is an alkali metal salt or amine salt of alkyl sulfonate or alkyl sulfate.

8. The method according to claim 7 wherein the builder salt is sodium sulfate and the acid is potassium hydrogen sulfate.

9. The method according to claim 8 wherein the dithiocarbamate is sodium dimethyldithiocarbamate.

10. The method according to claim 4 wherein the alkali salt is an alkali metal phenoxide which in the free phenol form is a bactericidal agent.

11. The method according to claim 10 wherein the alkali metal phenoxide is sodium trichlorophenoxide.

12. The method according to claim 11 wherein the emulsifier is an alkali metal salt or amine salt of alkyl sulfonate or alkyl sulfate, an ethylene oxide condensation product of alkylphenol, an ethylene oxide condensation product of fatty alcohol, or a combination thereof.

13. The method according to claim 12 wherein the emulsifier is a combination of an alkali metal alkylsulfonate with the condensation product of nonylphenol with nine moles of ethylene oxide.

14. The method according to claim 13 wherein the builder salt is sodium sulfate and the acid is potassium hydrogen sulfate.

15. The method according to claim 14 wherein the dithiocarbamate is sodium 1-morpholinecarbodithioate.

References Cited
UNITED STATES PATENTS

| | | | |
|---|---|---|---|
| 3,349,966 | 10/1967 | Schwartzman | 222—80 |
| 3,085,681 | 4/1963 | Fazzari | 206—47 A |
| 3,167,474 | 1/1965 | Hagemann | 424—286 |
| 3,198,698 | 8/1965 | Reuter et al. | 424—286 |
| 3,326,748 | 6/1967 | Popoff et al. | 424—286 |

OTHER REFERENCES

Lopatcki et al.: Chem. Abst., vol. 46 (1952), p. 7695h.

SAM ROSEN, Primary Examiner

U.S. Cl. X.R.

424—161, 248, 286